Patented Oct. 30, 1951

2,573,650

UNITED STATES PATENT OFFICE 2,573,650

WATER-RESISTANT GREASES

Walter H. Peterson, Point Richmond, Calif., assignor to Shell Development Company, San Francisco, Calif., a corporation of Delaware No Drawing. Application March 22, 1949,
Serial No. 82,905

16 Claims. (Cl. 252—28)

This invention relates to an improved lubricating grease composition and particularly to water-resistant inorganic gel greases and methods of preparing the same.

Greases gelled by the presence of inorganic aerogels are useful as replacements for ordinary soap greases and for special purposes such as high temperature lubrication and the like. Greases comprising inorganic gels posssess the characteristic property of structural stability at elevated temperatures. In fact, in some cases the gels become stiffer as the temperature increases. This property makes such greases of particular interest in the lubrication of bearings subjected to high temperatures such as in turbo-jet engines and in steel rolling mills. However, there are certain difficulties associated with the use of inorganic gel greases, the most prominent of which is their susceptibility to loss of structure under the influence of water or aqueous media.

When greases comprising an oil and an inorganic gel such as silica are treated with water or come in contact therewith, the grease gradually disintegrates into two phases and the grease properties are destroyed. It has been found that certain agents are capable of increasing the resistance of inorganic gel greases to deleterious action by water. Among these are soaps and amines, as indicated in pending applications to Fred H. Stross, Serial No. 782,695, filed October 28, 1947, and Serial No. 782,694, now Patent No. 2,554,222, filed October 28, 1947.

It is an object of the present invention to provide an improved inorganic gel grease. It is another object of the present invention to improve the water resistance of inorganic gel greases. It is a further object of the present invention to provide an improved process for the preparation of inorganic gel greases. Another object is to provide a means for raising or lowering the consistency of inorganic gel greases.

Now, in accordance with the present invention, it has been found that greases comprising oils gelled with inorganic gels such as silica may be made resistant to deleterious water action by the presence of a non-metallic hydroxy aliphatic organic compound having at least 8 carbon atoms. Still, in accordance with this invention, it has been found that the water resistance of inorganic gel greases is substantially improved by first incorporating the hydroxy compound in said grease and, subsequently, heating the composition at an elevated temperature for a short period of time. Again in accordance with the present invention, it has been found that the grease may be softened by incorporation of small amounts of said hydroxy compounds. Upon addition of larger amounts of the same class of agents the grease may be made harder than the original unmodified grease.

In its broadest aspect, the invention contemplates the use of hydroxy-containing organic compounds as defined above for the purpose of preventing disintegration of the grease by the action of water. The term "hydroxy" is meant to include only those compounds wherein the substituents are the entire functional group and not those compounds wherein the hydroxy group is only a part of a larger functional group. Hence, organic compounds such as fatty acids are excluded from the present definition since the hydroxy unit is only a part of the acid group in those instances.

The principal classes useful for protecting the greases described hereinafter are especially hydroxy fatty acids, monohydric alcohol, esters of said acids, polyhydric alcohols, esters of glycols and glycerols with hydroxy fatty acids, partial fatty acid esters of polyhydric alcohols, and natural products or modified natural products containing these types of compounds. It will be understood that other specialized groups of compounds meet the limitations given in the statement with the invention, but that these groups are preferred due to their availability and effectiveness.

The text by A. W. Ralston "Fatty Acids and Their Derivatives," John Wiley & Sons, Inc., 1948, describes the more important types of hydroxy fatty acids and their esters which have been found to be useful in the present invention. The preferred hydroxy fatty acids useful for increasing the water resistance of silica greases and the like include especially hydroxy stearic acids, and, more particularly, 12-hydroxy stearic acid. Other homologs have been found to be effective as well such as stearic acids having hydroxy substituents in the 9, 10 or 11 positions. Polyhydroxy compounds also are effective, such as 9,10 - dihydroxy stearic acid, 3,12 - dihydroxy palmitic acid or 9, 10, 16-trihydroxy palmitic acid. While the saturated acids are preferred, those containing olefinic or acetylenic linkages may be used if available. These include such acids as 12-hydroxy ricinoleic acid, 19-hydroxy nonadecanoic acid and wool wax acids.

The hydroxy fatty acid glycerides which may be used in accordance with this invention are preferably the glycerides of fatty acids containing 8 or more carbon atoms and 1 or more hydroxyl radicals which are separated from the carboxyl group by at least one carbon atom. The preferred form of the material, due to availability and cost, is hydrogenated castor oil. Other glycerides of hydroxy fatty acids are effective for the present purpose such as glycerides of the hydroxy fatty acids produced by catalytic oxidation of hydrocarbon oils and waxes which have been extracted and fractionated to a desirable molecular weight range.

Partial esters of polyhydric alcohols and partial ethers of polyhydric alcohols are effective waterproofing agents for use in the present compositions. The preferred type of esters falling within this class include mono-esters of glycerol wherein the ester radical contains at least 8 carbon atoms. A typical member of this class is glycerol monostearate. Ethers of glycerol containing 8 or more carbon atoms in the ether radical are exemplified by the mono-decyl ether of glycerol.

The esters of monohydric alcohols with hydroxy fatty acids have been found to be effective waterproofing agents. Preferably, the esters are formed from alcohols having from 4 to 16 carbon atoms such as butyl, octyl and dodecyl alcohols together with hydroxy fatty acids such as those described above. A particularly effective member of this series is the butyl ester of 12-hydroxy stearic acid.

Glycols having at least 8 carbon atoms in the molecule also are suitable. Specific members of this class include octane diol, 1,4-dodecane diol, 1,2-decane diol and 1,10-decane diol. It is a preferred practice to apply glycols having widely spaced hydroxyl groups since it has been noted that glycols having hydroxyl groups attached to adjacent carbon atoms soften the grease to a certain extent, but glycols having widely spaced hydroxyl groups do not affect the grease in this manner. The lower polymers of alkylene glycols such as polyethylene glycol and polymethylene glycol are suitable water-proofing agents. The molecular weight of these polymers should be at least about 200 and preferably not more than about 800. Polyalkylene glycols having one of the end hydroxyl groups in the form of an ether or ester may be used as well. A typical member of this class is the monobutyl ether of tetraethylene glycol.

Higher molecular weight monohydric alcohols may be used such as octyl, decyl, dodecyl, stearyl and similar aliphatic monohydric alcohols.

The amount of hydroxy compound should vary from about 0.5% to 40% by weight of the gel and preferably is present in an amount between 15% to 30%. The effective amount of hydroxy compound required for improving the water resistance of the greases described will vary with a number of factors; these include the molecular weight of the compound, the number of effective active groups such as hydroxyls, the amount of silica or other gel to be protected, and the surface area of said gel. The latter will depend upon the preparation of the gel and its subsequent grinding or reduction in particle size. The amount of silica or other gel will depend upon the grease consistency required. Ordinarily stated in terms of equivalence of effective hydroxyls it has been ascertained that from about .03 to about .10 equivalents of hydroxyls per 100 grams of silica gel provide excellent water protection for the greases. Preferably the hydroxyl equivalent is between .05 to .08 per 100 grams of silica. The equivalent value is determined by dividing the molecular weight of a given hydroxy compound by the number of effective hydroxyl groups in the molecule.

The oil components of the subject grease compositions may be described broadly as an oleaginous vehicle which includes the conventional mineral lubricating oils, the synthetic lubricating oils prepared by cracking and polymerizing products of the Fischer-Tropsch process and the like, or a synthetice oleaginous compound within the lubricating oil viscosity range. The synthetic oleaginous compounds are those which possess lubricating characteristics or to which such characteristics may be imparted and may be substituted in whole or in part for the conventional mineral lubricating oils. Examples of these compounds are the aliphatic dicarboxylic acid esters such as the alkyl esters of sebacic acid, the high molecular weight aliphatic ethers such as n-hexyl ether and the aromatic acid esters such as the alkyl esters of benzoic or phthalic acids. Other suitable synthetic lubricants include organic phosphates such as tricresyl phosphate, tributyl phosphate and mixed phosphates such as butyl dibenzyl phosphate. A special class of lubricants comprise the silicone oils which ordinarily require modification by the presence of a secondary lubricant or the use of lubricity imparting additives such as extreme pressure additives.

The agents which may be employed for the formation of greases in the oily fluids defined above include inorganic gels such as silica gel and other gels of inorganic oxides, hydroxides, sulfides and the like. It has been found to be substantially essential that the gels be used in a non-shrunken state such as may be obtained in the so-called "aerogel formation". Other means will be described hereinafter whereby gels suitable for use in the formation of greases may be prepared by other processes than aerogel formation. Typical aerogel greases are described in a patent to Kistler, U. S. 2,260,625. Other aerogels which are useful include magnesia, alumina, calcium oxide, and the like. Hollow spheroidal gels, such as those described by E. L. Largent in U. S. Patent 2,449,253, may be used in grease compositions.

One disadvantage which has been noted with respect to aerogels is their high bulk density. In accordance with one phase of the present invention, a means has been found for reducing the bulk density of aerogels and at the same time maintaining their ability to form greases with oleaginous components. This process comprises wetting the aerogel prepared after the manner described by Kistler with organic solvents such as acetone and isopentane. Other solvents comprise alcohols such as butyl alcohol, aldehydes such as acetaldehyde and similar low-boiling liquids having no solvent action on the aerogel and no chemical reaction therewith. The process comprises wetting the aerogel with a sufficient amount of the solvent such as acetone at room temperature and removing the solvent by warming or by the use of vacuum. The untreated aerogel has been found to be difficult to handle due to its high bulk density, while the treated aerogel appears to be in a more readily usable form resembling porous brittle aggregate lumps which are easily crushed to a powder.

The classes of polyvalent metal oxides and hydroxides forming gels are well known and do not require extensive discussion. These include the oxides and hydroxides of silicon, aluminum, chromium, copper, iron, manganese, titanium, nickel, calcium, germanium, molybdenum, thorium, tin and lead, and the like.

One of the means for preparing greases from inorganic gels without resorting to aerogel formation comprises dispersing an alcoholate or ester of the same group of metallic substances recited above in the lubricating medium and subsequently hydrolyzing to form the gel in situ, finally removing alcohol or other non-metallic products of the hydrolysis. This method inherently entails the advantage of avoiding aerogel formation and at the same time ensures the preparation of smooth, evenly dispersed greases having uniform structure.

A third method for the preparation of inorganic greases comprises formation of the hydrogel by well known processes commencing with an inorganic salt such as aluminum sulfate. By treatment of the salt dissolved in water with an agent such as ammonia, the hydrogel may be prepared and subsequently dehydrated by azeotropic distillation in the presence of a lower boiling alcohol such as ethanol. The alcohol suspension of the gel is then transferred to the lubricating oil medium after which alcohol is removed by distillation preferably in vacuum. Upon removal of the alcohol and subsequent milling, a grease structure results wherein the inorganic gel is uniformly dispersed throughout the lubricating medium.

Effective amounts of gelling ingredients ordinarily are from about 1 to about 20% by weight of the oleaginous base. Preferably, the amount of gelling agent is from about 2% to 10% by weight of the oleaginous base.

The greases may be prepared as described above, either by separate preparation of the non-shrunken gel or by formation of the gel in the presence of the oil. The addition of water-proofing hydroxy compounds such as those described hereinbefore is preferably carried out subsequent to grease formation. It has been found that the degree of water-proofing for a given amount of the hydroxy compound is substantially greater if addition is effected at this stage rather than prior to grease formation. However, effective water-proofing has been found to take place by initially dissolving the hydroxy compound in the oily medium and subsequently dispersing or forming the gel therein.

Other ingredients which may be used in inorganic gel greases water-proofed by the presence of hydroxy compounds comprise auxiliary gelling agents, corrosion inhibitors, extreme pressure additives and oxidation inhibitors. Extreme pressure agents such as sulfurized lard oil and chlorinated paraffin wax materially improve the operation of the greases under extreme pressure conditions. Among the effective oxidation inhibitors phenyl-beta-naphthylamine and phenyl-alpha-naphthylamine have been found to be especially effective while alpha-naphthol also has appreciable oxidation inhibiting action. Another outstanding class of oxidation inhibitors which simultaneously protect metallic surfaces from rusting include the alkaline earth metal salts of condensation products of an aldehyde with a phenol. A particularly desirable variety of this class is the calcium salt of the formaldehyde condensation product with para-tertiary-octyl phenol.

The following examples illustrate the process and products of the present invention.

*Example I*

Ten per cent by weight of a silica aerogel was dispersed in a low viscosity petroleum lubricating oil. The agents listed in the table below were added to samples of the resulting grease and tested for water-resistance under both hot and cold conditions. The water-resistance test comprises treating a small amount of the grease with water at room temperature and observing the time the grease remained homogeneous. The same type of test was carried out by heating a sample of the grease in the presence of water to the boiling point of water and observing the length of time which elapsed before signs of disintegration of the grease occurred. The following hydroxy compounds were found to materially improve the water resistance under both hot and cold conditions of the silica grease:

Glycerol monostearate
12-hydroxystearic acid
Hydrogenated caster oil
Cetyl alcohol
1,2-dodecane diol
1,10-decamethylene diol In all cases the greases containing the hydroxy compounds were found to be stable in the presence of cold and hot water, while unmodified silica grease disintegrated even in cold water.

*Example II*

A grease was prepared by dispersing 10 parts of a silica aerogel in 90 parts of a low viscosity mineral lubricating oil. The oil contained the various hydroxy compounds listed in the table below. For the purpose of comparison, duplicate samples of each grease were prepared, one of each pair containing five hundredths of an equivalent of effective hydroxyl groups per 100 grams of the aerogel. The second member of each pair contained .07 equivalent of effective hydroxyl groups per 100 grams of the aerogel. Each of the greases was found to have excellent resistance to the action of both cold and boiling water. The table which follows lists the micropenetration of each of the samples:

| Hydroxy Compound | Micropenetration of Samples Containing .05 Hydroxyl Equivalents | Micropenetration of greases Containing .07 Hydroxyl Equivalents |
| --- | --- | --- |
| 12-hydroxy stearic acid | 70 | 80 |
| Triglyceride of 12-hydroxy stearic acid | 75 | 100 |
| Glycerol monostearate | 112 | 83 |

I claim as my invention:

1. A grease composition comprising a mineral lubricating oil, 1 to 20% by weight of said oil of a silica aerogel, and 0.5 to 40% by weight of said aerogel of 12-hydroxystearic acid.

2. A grease composition comprising a mineral lubricating oil, 1 to 20% by weight of said oil of a silica aerogel, and 0.5 to 40% by weight of said gel of 1,10-decamethylene glycol.

3. A grease composition comprising a mineral lubricating oil, 1 to 20% by weight of said oil of a silica aerogel, and 0.5 to 40% by weight of hydrogenated castor oil.

4. A grease composition comprising a lubricating oil, 1 to 20% by weight of said oil of silica aerogel, and 0.5 to 40% by weight of said gel of a hydroxy fatty acid having at least 8 carbon atoms.

5. A grease composition comprising a lubricating oil, 1 to 20% by weight of said oil of silica aerogel, and 0.5 to 40% by weight of said gel of an ester of a hydroxy fatty acid, said ester having at least 8 carbon atoms.

6. A grease composition comprising a lubricating oil, 1 to 20% by weight of said oil of silica aerogel, and 0.5 to 40% by weight of said gel of a polyalkylene glycol having at least 8 carbon atoms.

7. A grease composition comprising a lubricating oil, 1 to 20% by weight of said oil of silica aerogel, and 0.5 to 40% by weight of said gel of a non-metallic hydrophobic aliphatic hydroxy organic compound having at least 8 carbon atoms.

8. A grease composition comprising a lubricating oil, 1 to 20% based on said oil of an inorganic gel, said gel retaining in the composition the gel structure substantially as originally formed, and 0.5 to 40% by weight of said gel of a non-metallic hydrophobic aliphatic hydroxy organic compound having at least 8 carbon atoms.

9. A grease composition comprising a lubricating oil, from 2 to 10% based on said oil of an inorganic gel, said gel retaining in the composition the gel structure substantially as originally formed, and 0.5 to 40% by weight of said gel of a non-metallic hydrophobic aliphatic hydroxy organic compound having at least 8 carbon atoms.

10. A grease composition comprising a lubricating oil, from 1 to 20% based on said oil of an inorganic gel, said gel retaining in the composition the gel structure substantially as originally formed, and 15–30% by weight of said gel of a non-metallic hydrophobic aliphatic hydroxy organic compound having at least 8 carbon atoms.

11. A grease composition comprising a mineral lubricating oil, 1 to 20% by weight of said oil of a silica gel, said gel retaining in the composition the gel structure substantially as originally formed and 0.5 to 40% by weight of said gel of glycerol monostearate.

12. A grease composition comprising a mineral lubricating oil, 1 to 20% by weight of said oil of a silica gel, said gel retaining in the composition the gel structure substantially as originally formed and 0.5 to 40% by weight of said gel of an ethylene glycol polymer having a molecular weight between about 200 and about 800.

13. A grease composition comprising a lubricating oil, 1 to 20% by weight of said oil of an inorganic gel, said gel retaining in the composition the gel structure substantially as originally formed and 0.5 to 40% by weight of said gel of a non-metallic hydrophobic aliphatic hydroxy organic compound having at least 8 carbon atoms, said compound being of the group consisting of hydroxy fatty acids, monohydric alcohols, esters of hydroxy fatty acids, polyhydric alcohols, and partial fatty acid esters of polyhydric alcohols.

14. A grease composition comprising a lubricating oil, 1 to 20% based on the weight of said oil of an inorganic oxide gel, said gel retaining in the composition the gel structure substantially as originally formed, and 0.5 to 40% by weight of said gel of a non-metallic hydrophobic aliphatic hydroxy organic compound having at least 8 carbon atoms.

15. A grease composition comprising a lubricating oil, 1 to 20% based on the weight of said oil of an inorganic hydroxide gel, said gel retaining in the composition the gel structure substantially as originally formed, and 0.5 to 40% by weight of said gel of a non-metallic hydrophobic aliphatic hydroxy organic compound having at least 8 carbon atoms.

16. A grease composition comprising a lubricating oil, 1 to 20% based on the weight of said oil of an inorganic oxide comprising magnesia, said gel retaining in the composition the gel structure substantially as originally formed, and 0.5 to 40% by weight of said gel of a non-metallic hydrophobic aliphatic hydroxy organic compound having at least 8 carbon atoms.

WALTER H. PETERSON.

REFERENCES CITED

The following references are of record in the file of this patent:

UNITED STATES PATENTS

| Number | Name | Date |
| --- | --- | --- |
| 2,260,625 | Kistler | Oct. 28, 1941 |
| 2,445,935 | Bondi | July 27, 1948 |
| 2,465,961 | Van Olphen | Mar. 29, 1949 |
| 2,475,589 | Bondi | July 12, 1949 |